(12) United States Patent
Plante

(10) Patent No.: US 12,290,017 B2
(45) Date of Patent: May 6, 2025

(54) SYSTEMS, METHODS, AND APPARATUSES FOR A DIGGING MACHINE

(71) Applicant: James R. Plante, Las Vegas, NV (US)

(72) Inventor: Soren James Plante, Las Vegas, NV (US)

(73) Assignee: Soren James Plante, Las Vegas, NV (US)

( * ) Notice: Subject to any disclaimer, the term of this patent is extended or adjusted under 35 U.S.C. 154(b) by 0 days.

(21) Appl. No.: 18/781,650

(22) Filed: Jul. 23, 2024

(65) Prior Publication Data

US 2024/0381807 A1  Nov. 21, 2024

(51) Int. Cl.
*A01C 5/04* (2006.01)
*A01B 69/04* (2006.01)
*A01C 7/00* (2006.01)

(52) U.S. Cl.
CPC .............. *A01C 5/04* (2013.01); *A01B 69/008* (2013.01); *A01C 5/045* (2013.01); *A01C 7/002* (2013.01)

(58) Field of Classification Search
CPC ........... A01C 5/04; A01C 5/045; A01C 7/002; A01C 5/00; A01C 7/00; A01B 69/008; A01B 69/007; A01B 69/00
See application file for complete search history.

(56) References Cited

U.S. PATENT DOCUMENTS

| | | | | |
|---|---|---|---|---|
| 3,491,466 A | * | 1/1970 | Barragan | E02B 5/02 37/190 |
| 3,500,988 A | * | 3/1970 | Smith | B65G 65/10 37/190 |
| 4,302,893 A | * | 12/1981 | van den Elshout | E02F 3/248 37/444 |
| 2011/0140383 A1 | * | 6/2011 | Brandeau | B60B 19/00 280/80.1 |
| 2017/0227969 A1 | * | 8/2017 | Murray | A01D 42/00 |

* cited by examiner

*Primary Examiner* — Christopher J. Novosad
(74) *Attorney, Agent, or Firm* — Workman Nydegger

(57) ABSTRACT

Digging machine having a body with an at least partially hollow interior and one or more odd-shaped wheels attached to the body, one or more motors disposed inside the body, and each motor can be configured to independently power one of the one or more odd-shaped wheels, where each of the one or more odd-shaped wheels include one or more digging members.

14 Claims, 7 Drawing Sheets

SYSTEMS, METHODS, AND APPARATUSES FOR A DIGGING MACHINE

BACKGROUND

1. Technical Field

Embodiments described herein relate to digging machines.

2. Background and Relevant Art

Excavators and digging machines are pieces of equipment in the construction, mining, and farming industries, where they are employed for a wide range of tasks including digging, trenching, and material handling. These machines are designed to efficiently move large quantities of earth and other materials, significantly reducing the manual labor required for such operations.

Modern excavators come in various sizes and configurations, ranging from compact models used in urban environments to large machines employed in mining operations. The primary components of an excavator include a boom, stick, bucket, and a rotating cab mounted on tracks or wheels. The hydraulic system powers the movement of these components, allowing for precise control and high force output.

Despite the advancements in excavator technology, there remain several challenges and limitations in their design and operation. One significant challenge is the large size of the machines, restricting the type of projects that they can be used for to larger, industrial scale digging projects. Additionally, the maneuverability of such large machines in smaller environments for smaller applications remains a challenge.

Accordingly, there are a number of challenges in the field of digging machines.

BRIEF SUMMARY

The present disclosure provides systems, methods, and apparatuses related to a digging machine. In at least one implementation, the system enables a more compact, efficient, and maneuverable digging machine.

Along these lines, the digging machine can include a body having a hollow interior and one or more odd-shaped wheels attached to the body. The digging machine can also include one or more motors disposed inside the body, and each motor can be configured to independently power one of the one or more odd-shaped wheels. Each of the one or more odd-shaped wheels can include one or more digging members.

In an additional or alternative embodiment, the digging machine can include a body having a hollow interior and one or more odd-shaped wheels attached to the body. The digging machine can also include one or more motors disposed inside the body, and each motor can be configured to independently power one of the one or more odd-shaped wheels. The digging machine can additionally include a seed distribution system disposed at least partly inside the body. Each of the one or more odd-shaped wheels can include one or more digging members.

In an additional or alternative embodiment, the digging machine can include a body having a hollow interior and one or more odd-shaped wheels attached to the body. The digging machine can also include one or more motors disposed inside the body, and each motor can be configured to independently power one of the one or more odd-shaped wheels. The digging machine can additionally include a computerized guidance system that can include one or more processors and one or more hardware storage devices that store instructions that can be executable by the one or more processors to cause the computer system to receive, from a user, input regarding a path for the digging machine to follow and to activate each of the one or more motors such that the one or more odd-shaped wheels rotate and drive the digging machine according to the path. Each of the one or more odd-shaped wheels can include one or more digging members.

Additional features and advantages will be set forth in the description which follows, and in part will be obvious from the description, or may be learned by practice. The features and advantages may be realized and obtained by means of the instruments and combinations particularly pointed out in the appended claims and aspects. These and other features will become more fully apparent from the following description and appended claims or may be learned by the practice of the examples as set forth hereinafter.

BRIEF DESCRIPTION OF THE DRAWINGS

In order to describe the manner in which the above recited and other advantages and features can be obtained, a more particular description briefly described above will be rendered by reference to specific examples thereof, which are illustrated in the appended drawings. Understanding that these drawings are merely illustrative and are not therefore to be considered to be limiting of its scope, embodiments described herein will be described and explained with additional specificity and detail through the use of the accompanying drawings in which.

DETAILED DESCRIPTION

Embodiments described herein provide systems, methods, and apparatuses related to a digging machine.

According to one implementation, a digging machine can include a body and one or more "odd-shaped" wheels attached to the body. The body can have an at least partially hollow interior. The digging machine can also include one or more motors disposed inside the body. Each motor can be configured to independently power one of the one or more odd-shaped wheels. Each of the one or more odd-shaped wheels can include one or more digging members.

In an additional or alternative embodiment, the digging machine can include a body having a hollow interior and one or more odd-shaped wheels attached to the body. The digging machine can also include one or more motors disposed inside the body, and each motor can be configured to independently power one of the one or more odd-shaped wheels. The digging machine can additionally include a seed distribution system disposed at least partly inside the body. Each of the one or more odd-shaped wheels can include one or more digging members.

Figure 1:
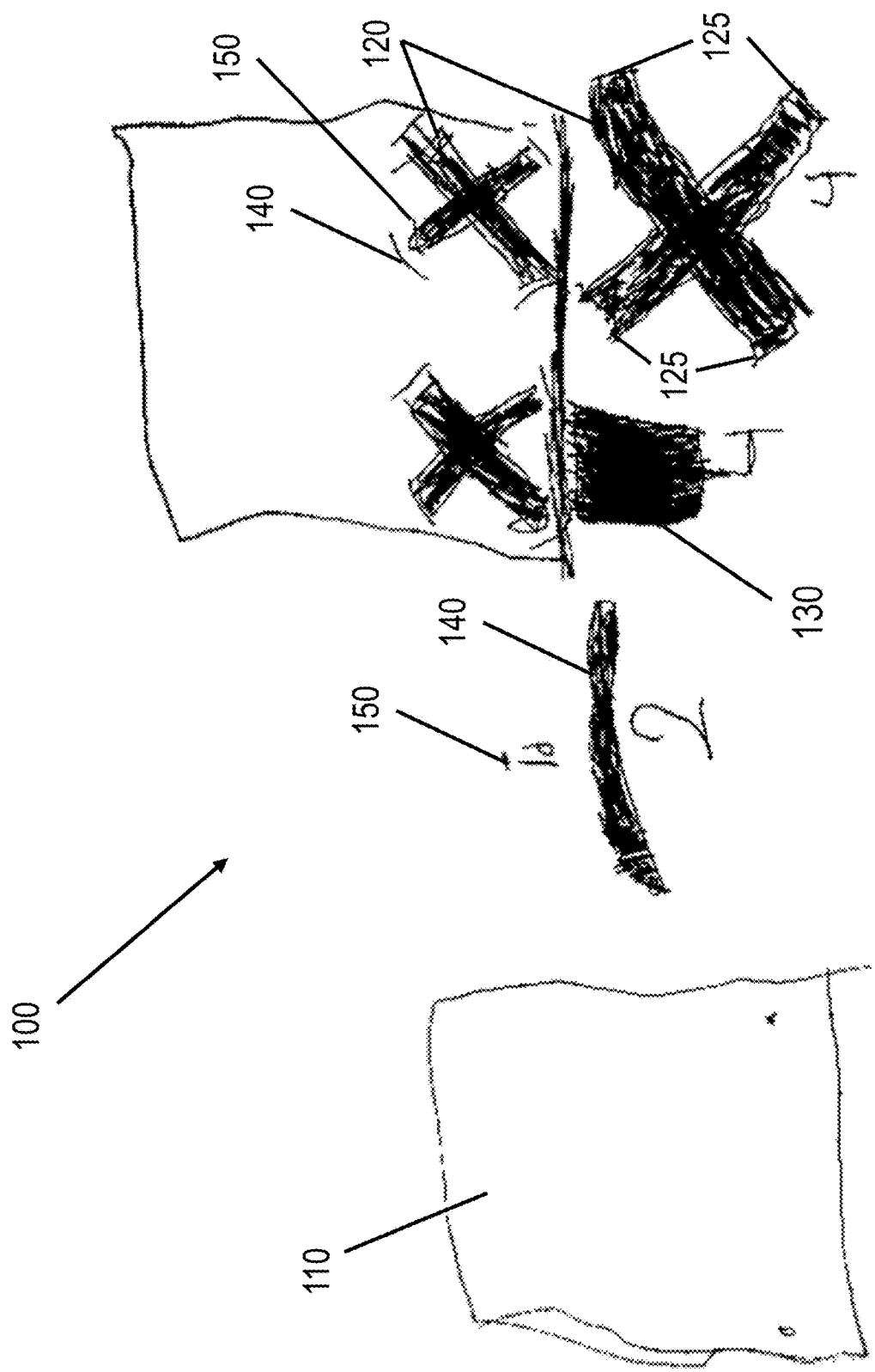
FIG. 1 illustrates a component view of a digging machine in accordance with one or more embodiments described herein.

In an additional or alternative embodiment, the digging machine can include a body having a hollow interior and one or more odd-shaped wheels attached to the body. The digging machine can also include one or more motors disposed inside the body, and each motor can be configured to independently power one of the one or more odd-shaped wheels. The digging machine can additionally include a computerized guidance system that can include one or more processors and one or more hardware storage devices that store instructions that can be executable by the one or more processors to cause the computer system to receive, from a user, input regarding a path for the digging machine to follow and to activate each of the one or more motors such that the one or more odd-shaped wheels rotate and drive the digging machine according to the path. Each of the one or more odd-shaped wheels can include one or more digging members FIG. 1 illustrates a component view of a digging machine in accordance with one or more embodiments described herein. FIG. 1 shows that a digging machine 100 can include a body 110. The body 110 can be hollowed out or can be a substantially solid. The body 110 can beneficially provide a housing for one or more components of the digging machine 100 and can beneficially protect the one or more components from damage caused by outside sources such as weather, dirt, water, and other environmental factors that could damage the one or more components.

FIG. 1 also shows that a digging machine 100 can include one or more odd-shaped wheels 120. For purposes of this disclosure, the term 'odd-shaped wheels' is limited to a modified wheel structure as shown in the Figures and described throughout this disclosure, in particular as discussed in associated with FIGS. 3A-3H below. The odd-shaped wheels 120 can be configured to provide movement to the digging machine 100 while simultaneously digging into the ground over which the digging machine 100 is moving. Accordingly, the odd-shaped wheels 120 can beneficially serve a multi-purpose function of moving the digging machine and digging into the ground on which the digging machine is moving.

FIG. 1 additionally shows that the digging machine 100 can include one or more motors 130 configured to power the one or more odd-shaped wheels 120. For example, there can be as many motors as there are odd-shaped wheels 120. If there are exactly as many motors 130 as there are odd-shaped wheels 120, then each motor 130 can be assigned a unique odd-shaped wheel 120 in a single motor 130 to single odd-shaped wheel 120 configuration. In such a way, each odd-shaped wheel 120 can be powered individually from one another, which can beneficially allow the digging machine to provide as much power as necessary to each odd-shaped wheel 120 in order to move the digging machine 100 while digging at the same time. Additionally, each odd-shaped wheel 120 can require a different amount of power to provide such movement and simultaneous digging. Accordingly, the single motor 130 to single odd-shaped wheel 120 configuration can be preferentially beneficial.

FIG. 1 also shows that the digging machine 100 can include a digging member such as one or more skewers 140. As used herein, the term 'skewer' is defined as a means for digging into the ground and can include conventional skewers, scoops, and/or anything described in this specification and/or shown in the figures to dig into the ground. The one or more skewers 140 can be one or more scoops and can be each be attached to a distal end 125 of the odd-shaped wheel 120. As shown in FIG. 1, the distal end 125 of the odd-shaped wheel 120 can be an end that is radially distal a center point of the odd-shaped wheel 120. Accordingly, each odd-shaped wheel 120 can have more than one distal end 125 as shown in FIG. 1. Each distal end 125 can be attached with one skewer 140 of the one or more skewers 140. As described in associated with FIGS. 3A-3H, the one or more skewers 140 can be one or more scoops and can function to dig into the ground over which the digging machine 100 is being moved by the odd-shaped wheels 120.

According to some embodiments, the one or more skewers 140 can dig into the ground before a distal end 125 of the odd-shaped wheel 120 contacts the ground. As the digging machine moves, the distal end 125 of the odd-shaped wheel 120 can be forced into the soil beneath the digging machine 100 by a weight of the digging machine 100 and a shape and size of the one or more skewers 140. The one or more skewers 140 can be disposed at the distal end 125 of the odd-shaped wheel 120 and can thus be at a length that is radially longer than the distal end of the odd-shaped wheel. Accordingly, when the distal end 125 of the odd-shaped wheel 120 contacts the ground, the skewer 141 is thrust further into the soil than the distal end 125 of the odd-shaped wheel 120. As the odd-shaped wheel 120 rotates, the skewer 141 can beneficially displace, move, relocate, and/or push the soil and form a hole in the soil. Accordingly, the skewer 140 can allow the digging machine to dig holes in the soil as the digging machine moves.

FIG. 1 additionally shows that the digging machine 100 can include one or more blades 150. The one or more blades 150 can be attached to the odd-shaped wheels 120 and can also be attached to the one or more skewers 140. For example, each odd-shaped wheel 120 can have a skewer 140 attached at a distal end 125 of the odd-shaped wheel. The skewer 140 can be attached with one or more blades 150. The one or more blades 150 can beneficially assist the skewer in penetrating the soil and digging a hole. The one or more blades 150 can be smaller than the skewer 140 and can be disposed about the distal end 125 of the odd-shaped wheel at opposite sides of the skewer 140.

According to some embodiments, the one or more blades 150 can be adjacent to the one or more digging members. For example, each skewer 140 can be disposed at a distal end 125 of the odd-shaped wheel 120. The distal end 125 and the The previously described embodiments have been discussed with a particular skewer 140 at a distal end 125 of an odd-shaped wheel 120. However, it should be noted that the skewer 140 is merely representative and can be replicated at each distal end 125 of each odd-shaped wheel. Additionally, the one or more blades 150 can be placed anywhere along the odd-shaped wheel that can assist the skewers in digging into the soil.

Figure 2:
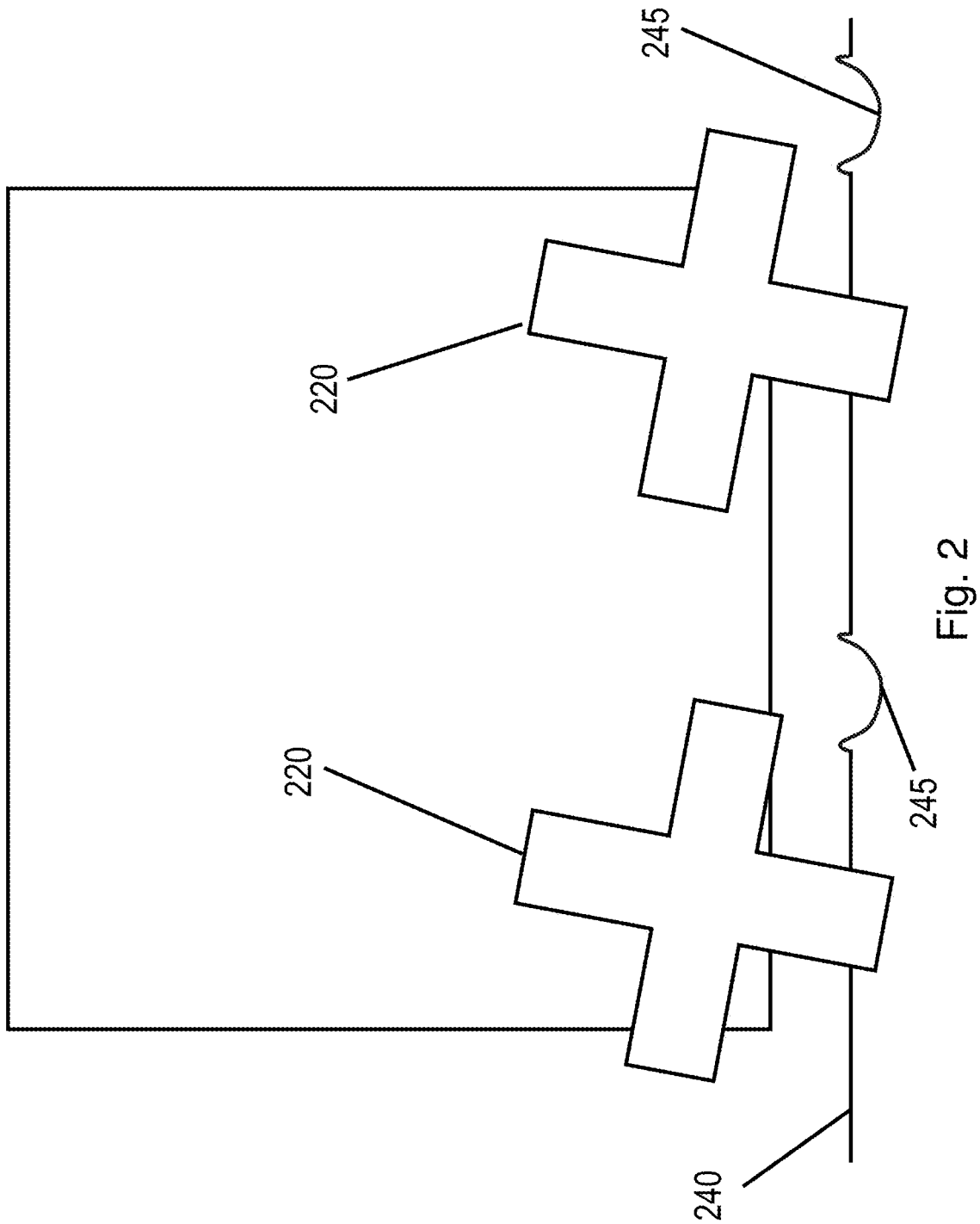
FIG. 2 illustrates a side perspective view of a digging machine in accordance with one or more embodiments described herein.

FIG. 2 illustrates a side perspective view of a digging machine in accordance with one or more embodiments described herein. As shown in FIG. 2, the one or more odd-shaped wheels 220 can be positioned at a bottom end of the body 210 of the digging machine 200. As shown in FIG. 2, there can be two odd-shaped wheels 220 on a side of the digging machine 200. The opposite side of the digging machine 200 can also include two odd-shaped wheels 220 for a total of four odd-shaped wheels 220. Each odd-shaped wheel 220 can come into contact with and dig into a ground surface 240. For example, the ground surface 240 can be a soil surface. When the distal end 225 of each odd-shaped wheel 220 digs into the ground surface 240, a hole 245 can be dug by the distal end 215 of the odd-shaped wheel.

Figure 3:
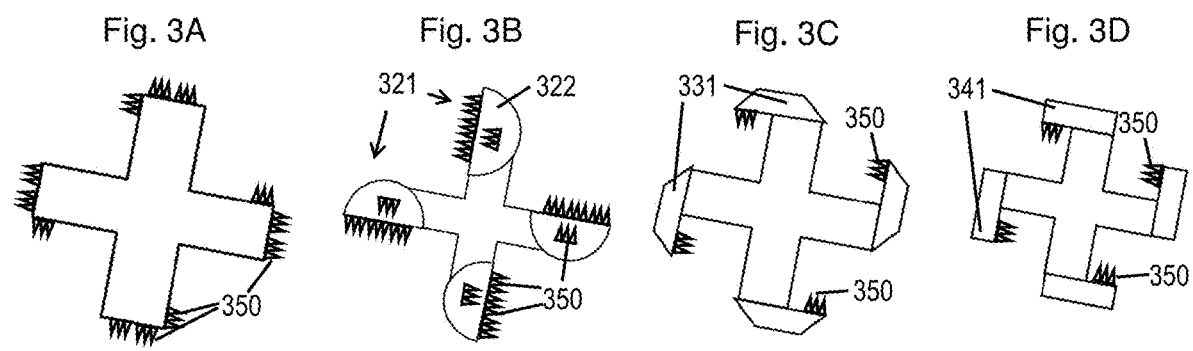
FIG. 3A illustrates an odd-shaped wheel in accordance with one or more embodiments described herein.
FIG. 3B illustrates an odd-shaped wheel in accordance with one or more embodiments described herein.
FIG. 3C illustrates an odd-shaped wheel in accordance with one or more embodiments described herein.
FIG. 3D illustrates an odd-shaped wheel in accordance with one or more embodiments described herein.
FIG. 3E illustrates an odd-shaped wheel in accordance with one or more embodiments described herein.
FIG. 3F illustrates an odd-shaped wheel in accordance with one or more embodiments described herein.
FIG. 3G illustrates an odd-shaped wheel in accordance with one or more embodiments described herein.
FIG. 3H illustrates an odd-shaped wheel in accordance with one or more embodiments described herein.
FIG. 3I illustrates an odd-shaped wheel in accordance with one or more embodiments described herein.
FIG. 3J illustrates an odd-shaped wheel in accordance with one or more embodiments described herein.
FIG. 3K illustrates an odd-shaped wheel in accordance with one or more embodiments described herein.
FIG. 3L illustrates an odd-shaped wheel in accordance with one or more embodiments described herein.

FIGS. 3A-3H each illustrate examples of odd-shaped wheels in accordance with one or more embodiments described herein. FIG. 3A shows that the odd-shaped wheel can include a plus-shaped wheel 310. FIG. 3E shows that the plus shaped wheel can be disposed within a wheel 313 such that the distal ends of the plus shaped wheel extend beyond the circumference of the wheel 313. In such a way, the distal ends of the plus shaped wheel 310 can dig into the ground while the wheel 313 can provide a smoother movement.

FIGS. 3B-3D and 3F-3H show that the odd-shaped wheel can include one or more skewers or scoops. As shown in FIG. 3B, there can be one scoop 321 attached to each distal end of the odd-shaped wheel 310. Each scoop 321 can have a circular or semicircular shape. Such a shape can beneficially enable the plus shaped wheel 310 to move a larger amount of soil than if there were no scoop. FIG. 3F shows that the scoop 321 can extend past the circumference of a support wheel 313 that the plus shaped wheel 310 is attached to.

FIG. 3C shows that a scoop 331 can have a trapezoidal shape. Such a shape can beneficially have a pointed edge for digging into the soil more effectively. FIG. 3G shows that the scoop 331 can extend past the circumference of a support wheel 313 that the plus shaped wheel 310 is attached to.

FIG. 3D shows that a scoop 341 can have a rectangular shape. Such a shape can beneficially have a large volume and a. FIG. 3H shows that the scoop 341 can extend past the circumference of a wheel 313 that the plus shaped wheel 310 is attached to.

While particular shapes and relative sizes of scoops are shown in FIGS. 3A-3H, each scoop can have any shape, including circular, semicircular, trapezoidal, triangular, and rectangular. The scoop can have a volume dependent on the shape. Accordingly, the size, shape, and volume of the hole created by the scoop can depend on the scoop at the distal ends of the odd-shaped wheels. The scoop can also have a contacting edge 370. The contacting edge 370 can be pointed or the contacting edge 370 can be flat. If the contacting edge 370 is pointed, then only a single point of the contacting edge can make contact with the soil initially. If the contacting edge 370 is flat, then the entire contacting edge 370 can make contact with the soil at the same time.

FIGS. 3I-3L illustrate examples of odd-shaped wheels in accordance with one or more embodiments described herein. For example, each of FIG. 3I-3L illustrates the embodiment shown in FIGS. 3A-3D, respectively, with one or more blades 350 attached to the plus shaped wheel 310. FIG. 3I shows that the one or more blades can be attached to the distal end 325 of the plus shaped wheel 310. FIG. 3J shows that the one or more blades 350 can be attached to a volume forming perimeter of the scoop 321 as well as to an outer surface 322 of the scoop 321. The one or more blades 350 on the perimeter of the scoop 321 can beneficially decrease the amount of force necessary to dig into the soil and thus improve the efficiency of the digging machine.

FIG. 3K shows that the one or more blades 350 can be attached to a volume forming perimeter of the scoop 331. FIG. 3L also shows that the one or more blades 350 can be attached to a volume forming perimeter of the scoop 341. The one or more blades 350 can beneficially reduce the amount of force necessary to puncture the soil and can thus improve the efficiency of the digging machine.

As shown in FIGS. 3I-3L, the one or more blades 350 can beneficially provide a saw-tooth shape for cutting into the soil. Because of the blades, the odd-shaped wheels can be able to better provide movement to the digging machine while simultaneously digging one or more holes. Accordingly, the blades can be mounted at any orientation that provides such an enhanced functionality of the odd-shaped wheels. For example, the odd-shaped wheels can be arranged at a 90-degree angle with respect to the one or more digging members.

In all configurations, the one or more odd-shaped wheels can beneficially dig into ground underneath the digging machine 100. For example, the digging machine 100 can be placed over an area of soil. When the odd-shaped wheels turn, the digging machine can move in a direction according to the rotation of the odd-shaped wheel while simultaneously digging into the soil. Wherever the distal ends of the odd-shaped wheel contact the soil, the distal ends of the odd-shaped wheels can displace a volume of the soil, creating a hole.

The size and shape of the hole can be dependent on the shape of the distal end of the odd-shaped wheels. For example, if the distal ends of the odd-shaped wheels are flat or blunt in shape, then the soil can be indented, compressed, and/or impressed to form a hole. In such an embodiment, the distal ends themselves form the digging members of the odd-shaped wheels.

If the distal ends of the odd-shaped wheels include a skewer or a scoop that is circular or semicircular shaped, then the soil can be scooped by the shape of the distal ends and thus relocated, creating a hole where the soil previously was. If the distal ends of the odd-shaped wheels include a skewer or a scoop that is triangular or trapezoidal in shape, then the soil can similarly be scooped and a volume thereof displaced.

Figure 4:
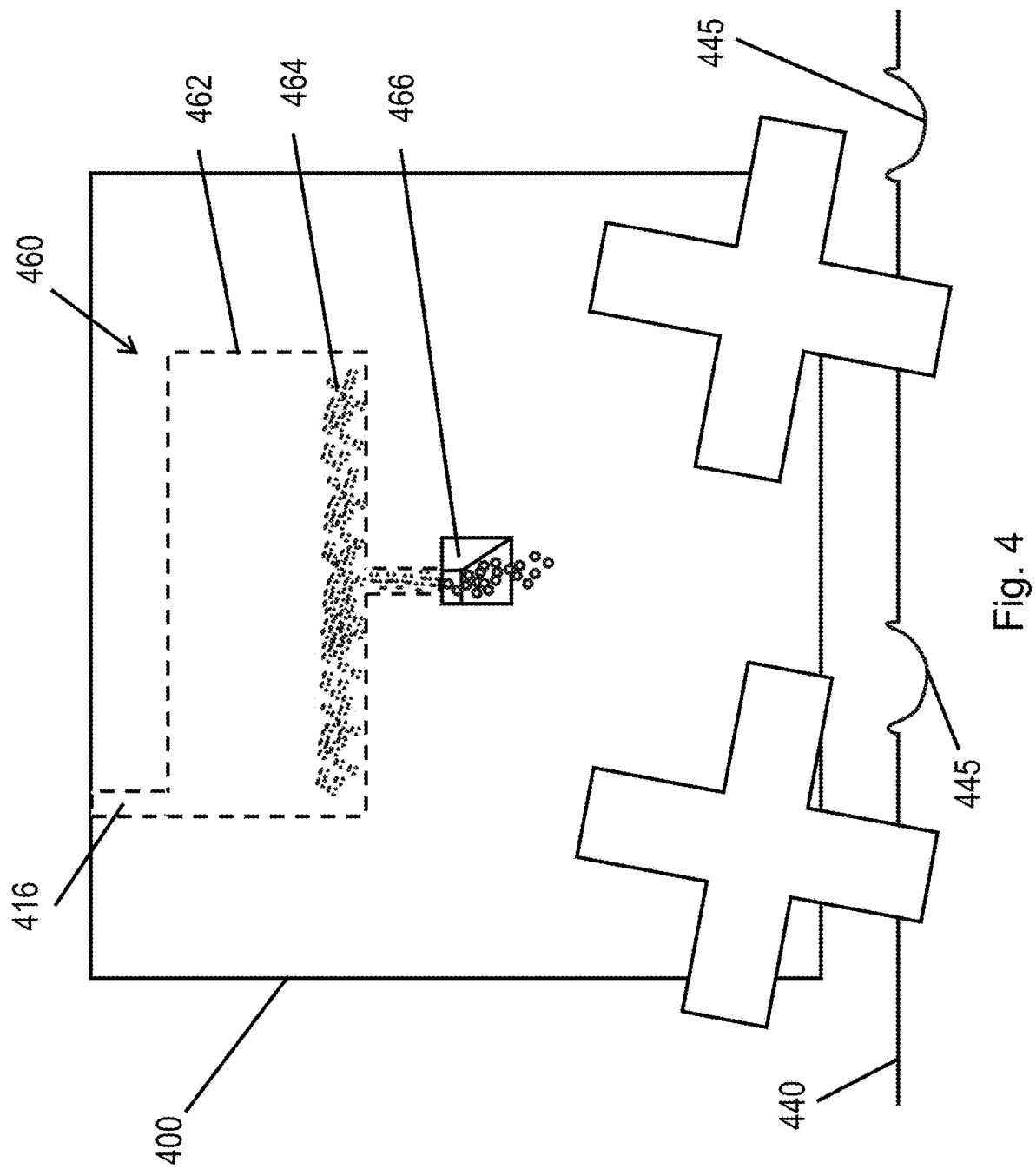
FIG. 4 illustrates a side perspective view of a digging machine with a seed distribution system in accordance with one or more embodiments described herein.

FIG. 4 illustrates a side perspective view of a digging machine with a seed distribution system in accordance with one or more embodiments described herein. As shown in FIG. 4, a digging machine 400 can include all features described above and additionally can include a seed distribution system 460. The seed distribution system 460 can include one or more reservoirs 462. Each of the one or more reservoirs 462 can include a volume that can contain one or more seeds 464. Each of the one or more reservoirs 462 can be disposed inside a body 410. Each of the one or more reservoirs 462 can be accessed through an access hatch 416 on the body 410. Such an arrangement can beneficially enable on-the-fly refilling of the one or more reservoirs with the one or more seeds 464.

FIG. 4 also shows that the seed distribution system 460 can include a distribution chute 466 for distributing the one or more seeds 464. For example, the distribution chute 466 can be disposed on a side of the body 410 and can extend from an interior of the body 410 through an exterior of the body 410 and can thus enable distribution of the one or more seeds 464. The distribution chute 466 can be disposed underneath a reservoir 462. During operation of the digging machine 400, the one or more seeds 464 can flow from the reservoir 462 through the distribution chute 466 onto and/or into the ground 440 underneath the digging machine 400. At least some of the one or more seeds 464 that fall through the distribution chute 466 can fall into the holes 445 dug by the odd-shaped wheels 420. Accordingly, the digging machine 400 can beneficially dig a hole 445 into the ground 440 and distribute at least one seed 464 into the hole that is dug. Such an advantage can be achieved by the one or more odd-shaped wheels 420 that provide movement to the digging machine 400 while digging the hole 445.

Figure 5:
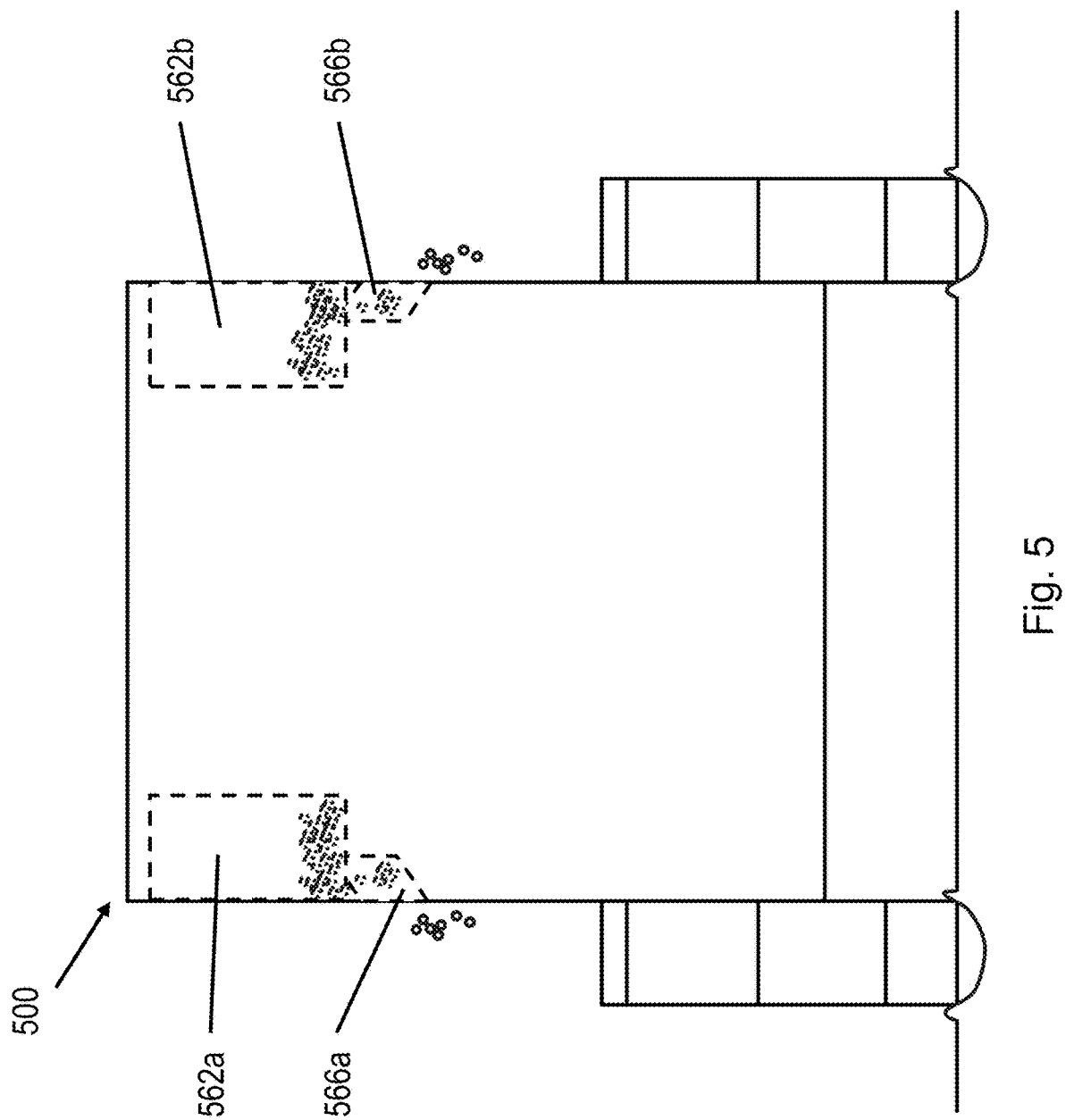
FIG. 5 illustrates a back perspective view of a digging machine with a seed distribution system in accordance with one or more embodiments described herein.

FIG. 5 illustrates a back perspective view of a digging machine with a seed distribution system in accordance with one or more embodiments described herein. As shown in FIG. 5, the digging machine 500 can include all features, components, and advantages described above and can additionally or alternatively include one or more reservoirs, for example exactly two reservoirs including a first reservoir 562a and a second reservoir 562b for holding one or more seeds 562. The first reservoir 562a can be substantially similar in shape and size to the second reservoir 562b or they can be different from one another in size and shape. Each of the first reservoir 562a and second reservoir 562b can be sized to maximize a volume of each reservoir within the interior of the body 510 and as defined by other components within the body 510. Accordingly, the reservoirs can enable an efficient use of interior space of the body 510 while maximizing the amount of seeds that the body 510 can carry and distribute.

FIG. 5 also shows that the first reservoir 562a and the second reservoir 562b can be on opposite sides of the body 510 and can thus allow the distribution of seeds on both sides of the digging machine 500. As shown in FIG. 5, the first reservoir 562a and the second reservoir 562b can be attached to a first distribution chute 566a and a second distribution chute 566b, respectively. Accordingly, the digging machine 500 can dig holes in two parallel lines while simultaneously distributing seeds to the holes.

Figure 6:
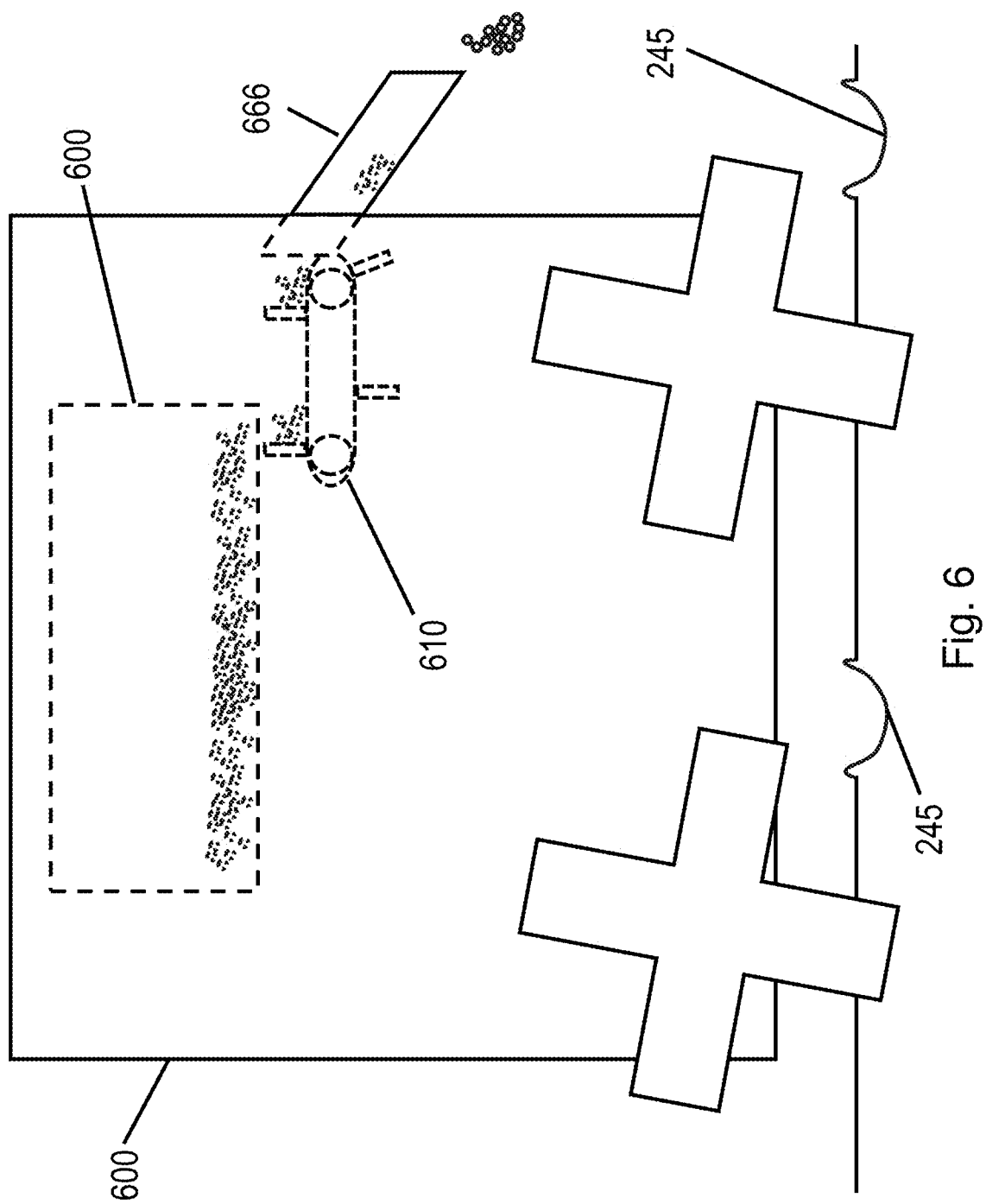
FIG. 6 illustrates a side perspective view of a digging machine with a seed distribution system in accordance with one or more embodiments described herein.

FIG. 6 illustrates a side perspective view of a digging machine with a seed distribution system in accordance with one or more embodiments described herein. The above-described features and advantages can be associated with the digging machine 600 as shown in FIG. 6. Additionally or alternatively, FIG. 6 shows that the digging machine 600 can include one or more geared transport belts 610 disposed beneath the reservoir and configured to deliver seeds from the reservoir to the one or more chutes 666. The geared one or more transport belts 610 can include a single transport belt.

Figure 7:
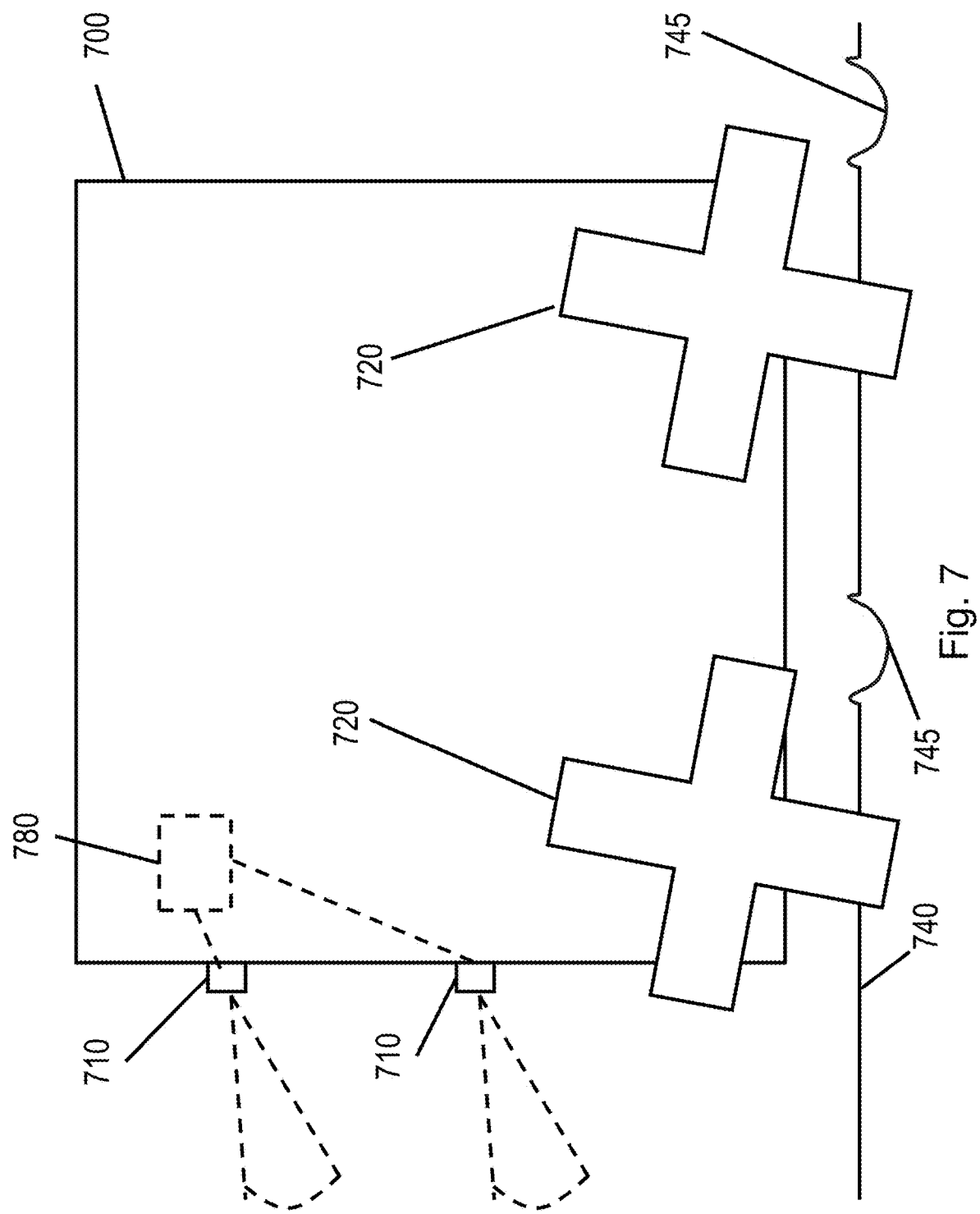
FIG. 7 illustrates a side perspective view of a digging machine with sensors in accordance with one or more embodiments described herein.

FIG. 7 illustrates a side perspective view of a digging machine with sensors in accordance with one or more embodiments described herein. As shown in FIG. 7, a digging machine 700 can include any and/or all of the previously described features, embodiments, and advantages. FIG. 7 also shows that the digging machine 700 can include one or more sensors 710. The digging machine 700 can also include a computer system for guidance. The computer system 780 can receive information from the one or more sensors 710 to determine a path for the digging machine to follow. For example, the one or more sensors 710 can be optical sensors that can receive visual information about the environment and determine a path using the visual information. In some embodiments, the visual information can include information indicating the presence of a track laid out for the digging machine 700 to follow. Accordingly, a user of the digging machine can lay out a track for the digging machine 700 to follow then simply activate the digging machine 700, and the digging machine 700 can fully autonomously follow the path laid out by the user.

According to some embodiments, the computer system 780 can receive, from a user, input regarding a path for the digging machine 700 to follow. The user can provide this input via a wireless communication using a remote controller. The input can indicate whether the digging machine 700 should move forward, backward, to the left, or to the right. Once the computer system 780 receives the input from the user, the computer system can activate each of the one or more motors such that the one or more odd-shaped wheels rotate and drive the digging machine according to the path. Such an embodiment can beneficially allow a user to determine a custom path for the digging machine 700 to dig holes in real time.

The present disclosure can comprise or utilize a special-purpose or general-purpose computer system that includes computer hardware, such as, for example, one or more processing modules and system memory, as discussed in greater detail below. The scope of the present disclosure also includes physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, the disclosure can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the disclosure.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system can view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processing modules, cause a general-purpose computer system, special-purpose computer system, or special-purpose processing device to perform a certain function or group of functions. Computer-executable instructions can be, for example, binaries, intermediate format instructions such as assembly language, or even source code.

Those skilled in the art will appreciate that the disclosure can be practiced in network computing environments with many types of computer system configurations, including, personal computers, desktop computers, laptop computers, message processing modules, hand-held devices, multi-processing module systems, microprocessing module-based or programmable consumer electronics, network PCs, mini-computers, mainframe computers, mobile telephones, PDAs, tablets, pagers, routers, switches, and the like. The disclosure can also be practiced in distributed system environments where local and remote computer systems, which are linked (either by hardwired data links, wireless data links, or by a combination of hardwired and wireless data links) through a network, both perform tasks. As such, in a distributed system environment, a computer system can include a plurality of constituent computer systems. In a distributed system environment, program modules can be located in both local and remote memory storage devices.

Although the subject matter has been described in language specific to structural features and/or method logical acts, it is to be understood that the subject matter defined in the appended claims is not necessarily limited to the described features or acts described above, or the order of the acts described above. Rather, the described features and acts are disclosed as example forms of implementing the claims.

The invention claimed is:

1. A digging machine comprising:
a body having an exterior surface and an at least partially hollow interior;
four wheels attached to the body and extending from the exterior surface such that the body is balanced and support on the four wheels, wherein each of the four wheels comprises four radially extending arms, wherein each of the four radially extending arms is arranged at an approximately 90-degree angle relative to adjacent arms, each arm having a distal radial end, wherein each of the distal radial ends comprises one or more digging members disposed thereat and/or extending therefrom, wherein at least one of the one or more digging members at each distal radial end of each arm comprises a skewer configured for digging into soil to produce a hole in the soil; and
four motors disposed inside the body, each motor being configured to independently power rotation of one of the wheels, wherein rotation of each of the wheels causes one of the skewers of each of the one or more digging member to simultaneously dig into the soil, thereby displacing a volume of the soil and creating the hole.

2. The digging machine according to claim 1, wherein each of the one or more digging members further comprises a scoop.

3. The digging machine according to claim 2, wherein the scoop has a flat contacting edge for contacting a ground or soil surface.

4. The digging machine according to claim 2, wherein the scoop has a pointed contacting edge for contacting a ground or soil surface.

5. The digging machine according to claim 2, wherein the scoop has a semicircular, a triangular, or a rectangular shape.

6. The digging machine according to claim 1 wherein one or more of the plurality of digging members further comprises a blunt surface.

7. The digging machine according to claim 1, wherein one or more of the plurality of digging members further comprise one or more blades extending therefrom.

8. The digging machine according to claim 7, wherein the one or more blades each have a saw-tooth shape adapted for cutting into soil.

9. The digging machine according to claim 7, wherein the one or more blades are arranged at a 90-degree angle with respect to a surface of the one or more digging members.

10. The digging machine according to claim 1, further comprising a seed distribution system disposed at least partly inside the body.

11. The digging machine according to claim 10, wherein the seed distribution system comprises a reservoir inside the body for holding seeds and one or more chutes disposed through the body and one or more geared transport belts disposed beneath the reservoir and being configured to deliver seeds to the one or more chutes.

12. The digging machine according to claim 11, wherein the seed distribution system comprises a first chute disposed at a rear of the body and aligned with adjacent wheels on a first side of the digging machine and a second chute disposed at the rear of the body and aligned with adjacent wheels on a second side of the digging machine, the first chute and second chutes extending beyond a back side of the body.

13. The digging machine according to claim 12, wherein the first chute and the second chute both extend beyond the respective wheels and digging members.

14. The digging machine according to claim 10, wherein the seed distribution system comprises:
a first seed reservoir and a second seed reservoir, the first seed reservoir being attached inside the body on a first side of the body the second seed reservoir being attached inside the body on a second side of the body that is opposite the first side of the body;
a first seed chute and a second seed chute, the first seed chute extending through a first hole on the first side of the body and the second seed chute extending through a second hole on the second side of the body, the first and second seed chutes receiving seeds from the first and second seed reservoirs, respectively.

* * * * *